US006092457A

United States Patent [19]

Inoue et al.

[11] Patent Number: 6,092,457

[45] Date of Patent: Jul. 25, 2000

[54] HYDRAULIC PUMP OR MOTOR

[75] Inventors: Kiyoshi Inoue; Takashi Teraoka; Takashi Itoh, all of Tokyo, Japan

[73] Assignee: Kayaba Kogyo Kabushiki Kaisha, Tokyo, Japan

[21] Appl. No.: 09/129,038

[22] Filed: Aug. 4, 1998

[30] Foreign Application Priority Data

Aug. 6, 1997 [JP] Japan .................................... 9-211888

[51] Int. Cl.[7] ........................................ F16J 1/10

[52] U.S. Cl. ........................................ 92/129; 92/71

[58] Field of Search ............................. 92/71, 110, 129, 92/187; 91/499; 417/269

[56] References Cited

U.S. PATENT DOCUMENTS

| | | | |
|---|---|---|---|
| 1,487,965 | 3/1924 | Michell | 92/57 |
| 2,380,607 | 7/1945 | Nystrom | 92/71 |
| 2,451,379 | 10/1948 | Burke | 92/71 |
| 2,947,182 | 8/1960 | Wahlmark | 92/71 X |
| 3,188,973 | 6/1965 | Firth et al. | 92/129 |
| 3,450,058 | 6/1969 | Stein | 92/71 |
| 4,662,267 | 5/1987 | Kaku et al. | 92/71 |
| 4,893,548 | 1/1990 | Kawahara et al. | 91/499 |
| 4,896,585 | 1/1990 | Forster | 92/71 X |
| 5,038,673 | 8/1991 | Schulze | 92/71 |
| 5,490,444 | 2/1996 | Claas | 92/71 |
| 5,554,009 | 9/1996 | Ohta et al. | 417/269 |
| 5,584,228 | 12/1996 | Jepsen | 92/71 |
| 5,588,347 | 12/1996 | Jepsen | 92/71 X |
| 5,601,009 | 2/1997 | Jepsen et al. | 92/71 |
| 5,676,035 | 10/1997 | Chrestoff et al. | 92/71 |
| 5,678,471 | 10/1997 | Ash, Jr. et al. | 92/71 |
| 5,752,428 | 5/1998 | Jepsen | 91/499 |
| 5,755,562 | 5/1998 | Novacek et al. | 417/269 |
| 5,758,566 | 6/1998 | Jepsen et al. | 92/71 X |
| 5,762,477 | 6/1998 | Jepsen et al. | 417/269 |
| 5,778,757 | 7/1998 | Kristensen et al. | 92/71 X |
| 5,784,951 | 7/1998 | Moller | 92/128 X |
| 5,813,315 | 9/1998 | Kristensen et al. | 92/71 |
| 5,868,061 | 2/1999 | Hansen et al. | 92/71 |
| 5,947,003 | 9/1999 | Jepsen et al. | 92/71 X |

FOREIGN PATENT DOCUMENTS

| | | | |
|---|---|---|---|
| 592577 | 3/1928 | France | 92/71 |
| 529 589 | 7/1931 | Germany . | |
| 597 476 | 5/1934 | Germany . | |
| 1061185 | 7/1959 | Germany | 92/71 |
| 4214765 A1 | 11/1993 | Germany | 417/269 |
| 4301123 A1 | 7/1994 | Germany | 417/269 |
| 48-6824 | 1/1973 | Japan . | |
| 48-55229 | 7/1973 | Japan . | |
| 48-57702 | 7/1973 | Japan . | |
| 48-68203 | 8/1973 | Japan . | |
| 61-118566 | 6/1986 | Japan | 417/269 |
| 8-151975 | 6/1996 | Japan . | |
| 1525301 | 11/1989 | Russian Federation | 92/71 |
| 517210 | 1/1940 | United Kingdom | 417/269 |

*Primary Examiner*—John E. Ryznic

*Attorney, Agent, or Firm*—Rabin & Champagne, PC

[57] ABSTRACT

A hydraulic pump or motor comprises a rotating disk member (31) supported free to rotate in a housing (11), and a cylinder block (14) supported free to rotate in the space of the housing (11) around a rotation axis inclined to the rotation axis of the rotating disk member (31). The rotating disk member (31) and cylinder block (14) are connected by a joint (17), and they are rotated in the same way by a drive shaft (12). A hemispherical shoe (29) in contact with the rotating disk member (31) via a spherical surface and having a smooth surface (29A) on the other side, comes in contact with a pad (27) of synthetic resin attached to the tip of a piston (20). The pad (27) has a smooth support surface (27A) perpendicular to the piston axis, and comes in contact with the smooth surface (29A) of the shoe (29) on this support surface (27A). A pocket (27D) for leading a cylinder internal pressure through the piston is formed on the contact surface between the pad (27) and shoe (29) forming a hydrostatic bearing. Each of the pistons (20) is pushed in the extending direction by a spring (21). A cylindrical piston cap (23) formed of a low friction synthetic resin on the outer circumference of the piston (20) slides in a cylinder bore (18).

6 Claims, 2 Drawing Sheets

HYDRAULIC PUMP OR MOTOR

FIELD OF THE INVENTION

The present invention relates to a hydraulic pump or motor, in particular to a hydraulic axial piston pump or motor which is most suited to using water as a working fluid.

BACKGROUND OF THE INVENTION

In a hydraulic axial piston pump, a component force, i.e. a lateral force, at right angles to the piston axis acts on the piston as a reactive force according to the inclination of a swash plate or a cylinder block. Therefore, a large frictional force is produced on the sliding surfaces of the piston and the cylinder bore.

When oil is used as the working fluid, it lubricates against the friction of the sliding surfaces, and it therefore provides durability.

However when water is used, lubricating performance is low, and durability remarkably decreases.

Attempts have been made to lubricate the sliding surfaces with lubricating oil and to prevent the oil from mixing with water by a seal provided on the outer circumference of the piston, but as the seal is not perfect, the water is polluted by the oil.

In Japanese Utility Model Laid-Open 48-55229, 48-6824, 48-57702, 48-68203 or Japanese Patent Laid-Open 8-151975 disclosed by the inventor, a construction was proposed wherein the piston and a shoe are brought into contact on a flat surface at right angles to the piston axis to decrease the lateral force acting on the piston. Therefore, component force acting in a direction at right angles to the piston axis which is exerted by the shoe on the piston does not occur, and the lateral force acting on the piston is very much reduced.

The friction of the sliding surface between the piston and the cylinder bore is thereby decreased, but as lubricating performance is poor when water is used as working fluid, there is still a large friction on the sliding surface not only between the piston and the cylinder, but also between the piston and shoe or between the shoe and swash plate. There was thus still a problem of durability.

This problem was not solved by the pumps disclosed in the specifications of German Patents 529589, 597476, and U.S. Pat. No. 3,162,142.

SUMMARY OF THE INVENTION

The object of this invention is to provide a hydraulic pump or motor with high durability for practical use.

A further object of this invention is to prevent sliding parts from wearing out even if water is used as working fluid, and to provide a hydraulic pump or motor which can maintain stable performance in the long term.

To achieve this purpose, the hydraulic pump or motor of this invention comprises a rotating member supported free to rotate in a housing and a cylinder block supported free to rotate in an inner space of the housing, this cylinder block being inclined to the rotation axis of the rotating member.

Plural cylinder bores are arranged in a circle centered on the rotation axis of the cylinder block. Pistons are housed free to slide in each of these cylinder bores.

Valve plates fixed to the housing, which progressively allow inflow and outflow of working fluid to and from the cylinder bores, slide on the base of the cylinder block.

The aforesaid rotating disk member and the cylinder block are connected by a joint which causes them to rotate together, and the rotating disk member or cylinder block are connected to a drive shaft.

In addition, a hemispherical shoe which comes in contact with the rotating disk member via a spherical surface, and a low friction synthetic resin pad attached to the end of the piston having a smooth support surface perpendicular to the piston axis which comes in contact with this shoe, are provided.

A pocket to which the cylinder internal pressure is led through the inside of the piston is formed in the contact surface between this pad and the shoe.

A spring which pushes the piston in the extending direction is provided, and a cylindrical piston cap of low friction synthetic resin which comes in contact with the cylinder bore fits on the outer circumference of the piston.

Component forces in the axial direction of the piston and in a transverse direction perpendicular to this direction, which are a reaction from the shoe, tend to act according to the inclination of the rotating disk member and the cylinder block cylinder internal pressure at any time.

However, as the shoe comes in contact with the low friction pad on a smooth surface perpendicular to the piston axis, the component force in a direction parallel to the contact surface does not occur, and there is almost no lateral force acting on the piston. Also, due to the piston cap which fits on the outer circumference of the piston, there is very little friction with the cylinder bore, and wear on the piston sliding surface is exceedingly small.

The cylinder internal pressure is led to the pocket provided in the contact surface between the shoe and the pad which comprises a hydrostatic bearing, so contact friction is very small, and as the pad is formed of a very low friction synthetic resin, wear on the shoe is very low.

In another embodiment of this invention, a synthetic resin socket fits onto the rotating disk member, the spherical surface of the shoe being free to slide in a hemispherical depression in this socket. Further, a pocket to which the cylinder internal pressure is led through the inside of the piston is formed in the spherical contact part between the socket and the shoe. As a result, a hydrostatic bearing is formed between the contact surfaces.

In yet another embodiment, the outer circumferential surface and the end face of the rotating disk member are supported free to slide relative to a part of the housing. Pockets are formed on each of the supporting surfaces, so friction on the sliding surfaces is reduced.

In yet another embodiment, a low friction synthetic resin disk member is interposed between the end face of the rotating disk member and the housing, and a synthetic resin bush is interposed between the outer circumference of the rotating disk member and the housing.

In yet another embodiment, the spring which pushes the piston is a coil spring, and a spring supporter of low friction synthetic resin which prevents buckling of the spring is inserted in the center of the spring.

DESCRIPTION OF THE PREFERRED EMBODIMENTS

Figure 1:
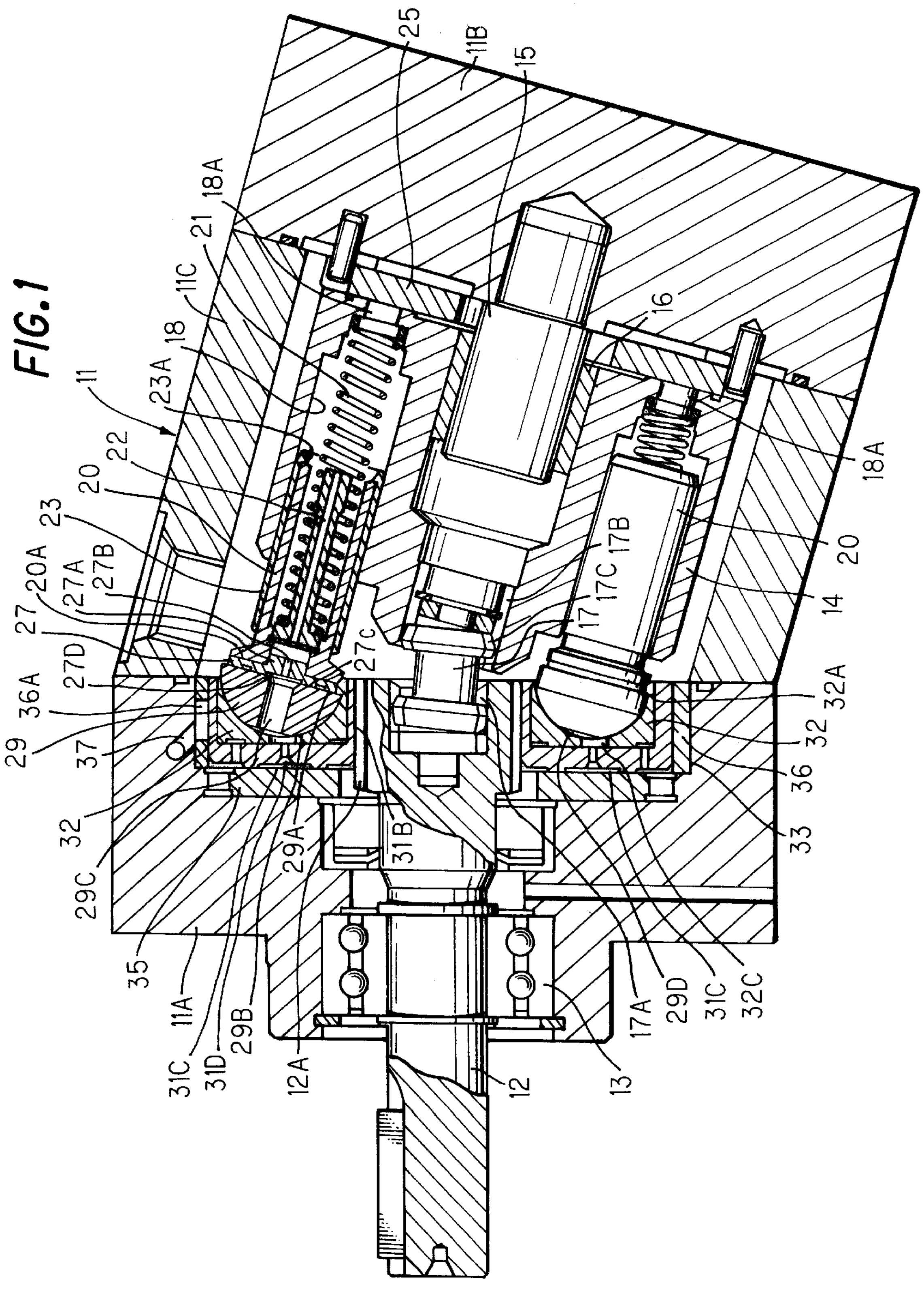
FIG. 1 is a sectional view of a hydraulic pump to which this invention is applied.

Referring to FIG. 1 of the drawings, this embodiment applies to an axial piston pump. A pump housing 11 comprises a cylindrical case 11C formed between a side block 11A and a port block 11B.

A pump drive shaft 12 which penetrates the side blocks 11A is supported free to rotate by a bearing 13. A cylinder block 14 is arranged in the internal space of the pump housing 11.

A rotation shaft 15 supported by the port block 11B is inserted in the center of the cylinder block 14 via a bearing 16, and the cylinder block 14 rotates around the shaft 15.

The cylinder block 14 is inclined to the drive shaft 12 at a certain angle so that the axes of the pump drive shaft 12 and pump drive shaft 15 intersect. The drive shaft 12 and cylinder block 14 are connected via a joint 17 so that the rotation of the drive shaft 12 is transmitted to the cylinder block 14.

Spline heads 17C at both ends of the joint 17 engage with a spline hole 17A formed in an end face of the drive shaft 12 and a spline hole 17B similarly formed in the center of an end face of the cylinder block 14.

The spline heads 17C have a spherical outer circumference, so good contact is always maintained when rotation is transmitted from the drive shaft 12 to the cylinder block 14 even when the axes of the spline holes 17A, 17B intersect.

Plural cylinder bores 18 are formed in the cylinder block 14 with their axes parallel to the rotation shaft 15 at equal intervals on a circle centered on the rotation shaft 15.

Pistons 20 are housed free to slide respectively in these cylinder bores 18. Each piston 20 is pushed in the extending direction by a coil spring 21 arranged in the cylinder bore 18.

To prevent the spring 21 from buckling, a spring supporter 22 is provided in the spring 21. The spring supporter 22 is positioned in the hollow piston 20 and its ends are fixed to prevent buckling of the spring 21. It does not come in contact with the inner circumference of the piston 20. The spring supporter 22 is formed of a low friction material.

A tubular piston cap 23 of synthetic resin (engineering plastic) is fixed by fitting on the outer circumference of the piston 20. As a result, friction of the sliding surface with the cylinder bore 18 is reduced.

The piston cap 23 has a length at least equal to the effective stroke of the piston 20, and a bowl-shaped part 23A at its tip engages with the inner surface of the piston 20.

The piston cap 23 comprises a polymer material of low frictional coefficient which may be reinforced with carbon fiber if necessary.

A pair of kidney ports, not shown, are provided on the intake side and discharge side in a valve plate 25, which are successively connected to each of the cylinder bores 18 via the ports 18A from the base of the cylinder block 14 as the cylinder block 14 rotates.

As a result, when the piston is depressed, working fluid is discharged from the cylinder bore, and when the piston extends, working fluid is aspirated in the cylinder bore.

A discharge passage and suction passage, not shown, which are connected to these kidney ports, are formed in the port block 11B.

Figure 2:
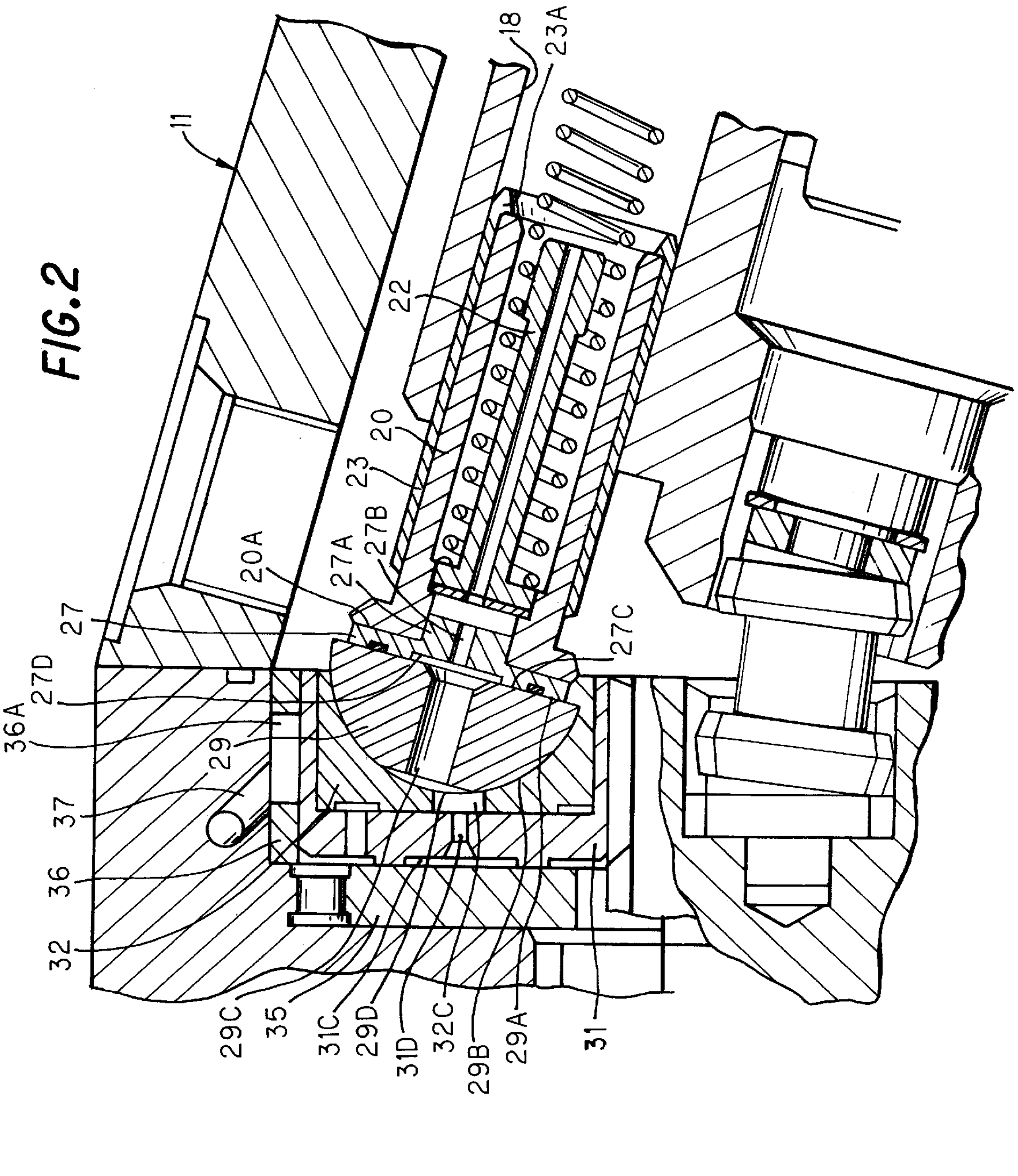
FIG. 2 is an enlarged sectional view of part of a piston.

The tip of the piston 20 has a flat surface 20A at right angles to the axis, as shown in FIG. 2. A pad 27 formed of a synthetic resin with low frictional coefficient is pressed into the tip as described hereabove. A convex part 27A is provided on the rear of the pad 27, and this convex part 27A engages with a hole in the piston 20. A throughhole 27B is provided in the center of the convex part 27A which connects with the interior of the piston.

A pocket 27D is formed in a flat support surface 27C of the pad 27, the internal cylinder pressure being led to the pocket 27D through the interior of the piston.

A hemispherical shoe 29 which comes in contact with this pad 27 is provided.

The shoe 29 is supported in the side block 11A by a socket 32 which engages with the torque plate 31 surrounding the pump drive shaft 12.

Each of the sockets 32 is formed of a synthetic resin with low frictional coefficient as above, and respectively engages with a depression 31A formed in the torque plate 31.

A hemispherical depression 32A is provided in the socket 32, and a spherical part 29B of the shoe 29 is housed in this depression 32A such that it is free to slide.

A smooth surface 29A of the shoe 29 is formed with effectively a slightly larger or almost similar diameter as the support surface 27C of the pad 27, and the smooth surface 29A and support surface 27C come in contact with each other.

Fluid pressure in the piston is led to the pocket 27D, and a hydrostatic bearing is formed on this contact surface due to pressurized fluid between the shoe 29 and pad 27. The load is supported by the fluid pressure, and wear on the surfaces is greatly reduced.

In addition, a throughhole 29C is formed in the shoe 29 from the smooth surface 29A to the spherical surface 29B. Fluid is led from the pocket 27D of the pad 27 to the pocket 29D formed in part of the spherical surface 29B so as to form a hydrostatic bearing as described above, and the friction between the contact surfaces is decreased.

A central spline hole 31B engages with a spline part 12A provided on the outer circumference of the pump drive shaft 12, and the torque plate 31 rotates together with the drive shaft 12.

The torque plate 31 therefore rotates in the same way and in the same direction as the cylinder block 14.

The shoe 29 supported by the socket 32 of the torque plate 31 and the piston 20 which comes in contact with it via the pad 27 always have almost the same positional relationship, and rotate in almost the same circle about the drive shaft 12 as a center.

The torque plate 31 installed in the side block 11A, is housed in a circular depression 33 centered on the drive shaft 12.

A disk-shaped thrust plate 35 is arranged at the base of the torque plate 31. The thrust plate 35, which is also formed of a synthetic resin with low frictional coefficient, is fixed to the side block 11A.

A pocket 31C is formed in the torque plate 31 in the sliding surface with the thrust plate 35, and fluid pressure is led to this pocket 31C.

The fluid pressure is led from a portion of the shoe 29 which forms a hydrostatic bearing to the pocket 31C via a throughhole 32C in the socket 32, and a throughhole 31D in the torque plate 31.

The contact surface between the torque plate 31 and thrust plate 35 is thereby supported by the hydrostatic bearing, and the sliding friction is reduced.

A bush 36 of a synthetic resin of low frictional coefficient is arranged on the outer circumference of the torque plate 31. Pressurized fluid is led to the sliding surface between the outer circumference of the torque plate 31 and the inner circumference of the bush 36, thus forming a hydrostatic bearing which decreases wear.

For this purpose, a pressure guide passage 37 which connects with the pump discharge passage is formed in the side block 11A. The pressurized fluid is led to a pocket 36A in the bush 36.

When the pump drive shaft 12 is rotated by a motor, not shown, the torque plate 31 rotates together with it, and the cylinder block 14 also rotates simultaneously via the joint 17. As the cylinder block 14 is inclined to the torque plate 31, the distance in an axial direction between opposite positions of the cylinder block 14 and torque plate 31 varies due to the rotation.

In the process where this distance is increasing, the piston is pushed by the spring 21 so that it extends while maintaining contact with the shoe 29. Working fluid is therefore aspirated into the cylinder bore 18 via the port 18A.

On the other hand, in the process where this distance is decreasing, the piston 20 is depressed by the shoe 29, and fluid is discharged from the interior of the cylinder bore via the port 18A.

Due to the action of the valve plate 25, fluid is therefore aspirated from the intake passage and discharged to the discharge passage.

Hence the piston 20 extends and contracts in contact with the shoe 29 supported by the torque plate 31 due to the rotation of the cylinder block 14, aspiration and discharge of working fluid in the cylinder bore is repeated, and the construction functions as an axial piston pump.

A force acts on the piston 20 in the axial direction according to the pressure of the fluid in the cylinder bore 18, and this force is received by the torque plate 31 via the shoe 29.

In this case, the torque plate 31 is not at right angles to the axis of the piston 20 but is inclined at a certain angle, so the reactive force of the shoe 29 has a component force in a direction at right angles to the axis of the piston 20.

However, as the piston 20 and shoe 29 are in contact on a flat surface perpendicular to the axis, or more specifically, the support surface 27C of the pad 27 which fits on the piston 20 is in contact with the smooth surface 29A of the shoe 29, the component force parallel to this contact surface, i.e. in a direction perpendicular to the axis of the piston 20 almost does not occur.

Therefore, hardly any lateral force acts on the piston 20 in a perpendicular direction to the axis, and the surface pressure on the sliding surface of the cylinder bore 18 becomes very small.

The rotating torque of the pump drive shaft 12 is transmitted to the cylinder block 14 via the joint 17, and the rotating torque of the drive shaft 12 is also transmitted to the torque plate 31 via the spline 12B, so the cylinder block 14 rotates together with the torque plate 31, and the piston 20 and shoe 29 rotate around the pump drive shaft 12 while maintaining almost an identical positional relationship. This means a relative torque difference is not generated in the circumferential direction due to this rotation, and a lateral force does not act on the piston 20.

The friction on the sliding surface between the piston 20 and cylinder bore 18 is mainly due to the lateral force acting on the piston 20. Therefore, as the lateral force becomes small, the sliding frictional force can be reduced accordingly.

A synthetic resin cap 23 is fixed on the outer circumference of the piston 20 to reduce the frictional resistance on the contact surface with the cylinder bore 18.

As a result of these measures, the frictional force on the sliding surface of the piston 20 with the cylinder bore 18 decreases, so wear on the sliding surface decreases, even if water is used as working fluid, and high durability is obtained.

Moreover, as the low friction resin pad 27 is interposed between the piston 20 and shoe 29, metal contact between the piston 20 and shoe 29 is avoided.

In addition, the pocket 27D is formed in the pad 27. The internal pressure of the cylinder bore 18 is led into this pocket 27D through the interior of the cylinder to form a hydrostatic bearing between the pad 27 and shoe 29.

The contact pressure due to fluid pressure is thereby reduced, and wear is reduced.

The contact pressure between the pad 27 and shoe 29 is high during the discharge stroke and low during the intake stroke of the piston 20. Therefore, the pressure required of the hydrostatic bearing is high during the discharge stroke and low during the intake stroke.

As the internal pressure of the cylinder bore 18 is supplied to the pocket 27D via the piston 20 without modification, the cylinder internal pressure coincides with the fluid pressure characteristics required of the hydrostatic bearing, so the hydrostatic bearing always functions well.

The synthetic resin socket 32 is provided between the shoe 29 and torque plate 31 by avoiding direct contact between the shoe 29 and torque plate 31 as described above, metal contact is avoided.

Fluid pressure is also led to a spherical contact surface between the socket 32 and shoe 29 via the throughhole 29C, so a hydrostatic bearing is formed between the contact surfaces. Mechanical contact on this sliding surface is therefore also reduced, and wear is decreased.

A reaction from the piston 20 acts on the torque plate 31 which rotates together with the pump drive shaft 12, and the piston is pressed in the thrust direction and radial direction against a depression in the side block 11A according to the inclination of the piston 20.

However, the torque plate 31 comes in contact with the synthetic resin thrust plate 35 in the direction of the rotation axis, i.e. the thrust direction, and comes in contact with the synthetic resin bush 36 in the direction of the rotation radius, i.e. the radial direction. In both cases, therefore, metal contact of sliding surfaces is avoided.

Fluid pressure is led also to the contact surface with the thrust plate 35 and the contact surface with the bush 36 so as to form hydrostatic bearings, so mechanical contact decreases.

Wear of the torque plate 31 is therefore reduced and durability increases.

Therefore, frictional force and wear are reduced on the sliding surface between the piston 20 and shoe 29, the spherical sliding surface between the shoe 29 and torque plate 31, and the thrust sliding surface and radial sliding surface between the torque plate 31 and side block 11A, so high durability is obtained even if water, which has inferior lubricating properties, is used as working fluid.

The spring 21 which pushes the piston 20 in the extension direction is subject to a centrifugal force when the cylinder block 14 rotates, and, therefore, the spring 21 buckles toward the outside of the rotation.

Consequently, if the spring 21 comes in contact with the inner circumference of the piston 20, its durability is impaired.

However, the spring 20 is supported by a spring supporter 22 of synthetic resin which stops the spring from buckling.

Therefore wear in the spring 20 is avoided, buckling does not occur and durability increases.

As the piston 20 is pushed in the extension direction by the spring 21, the shoe 29 remains in contact with the pad 27, so the shoe 29 does not drop out even if shoe 29 is not fixed in the socket 32.

In the above description, the drive shaft 12 is connected to the torque plate 31, but the drive shaft can be installed in the port block and connected directly to the cylinder block 14.

In this case, the torque plate 31 is joined to the cylinder block 14 or drive shaft by a joint 17 to transmit the rotation.

According to this embodiment, the invention was applied to an axial piston pump, but it may also be used as an axial piston motor. In this case, the piston extends due to pressurized fluid supplied from the pump, the cylinder block rotates, the drive shaft rotates due to this rotation, and this is extracted as an output.

It will be understood that various modifications are possible within the scope and spirit of the invention, and that the invention is not limited to the aforesaid embodiments.

What is claimed:

1. A hydraulic pump or motor comprising:

a rotating disk member supported free to rotate in a housing, a cylinder block supported free to rotate in the inner space of said housing about a rotation axis inclined to the rotation axis of said rotating disk member, plural cylinder bores arranged in a circle centered on the rotation axis of said cylinder block, pistons housed free to slide in said each cylinder bores, a valve plate in sliding contact with the base of said cylinder block which is fixed to said housing and successively permits inflow and outflow of a working fluid to and from said cylinder bores according to the rotation of said cylinder block, a joint which causes simultaneous rotation of said rotating disk member and said cylinder block, and a drive shaft connected to said rotating disk member or said cylinder block, further comprising:

a hemispherical shoe in contact with said rotating disk member via a spherical surface having a smooth surface on the opposite side, a pad of low friction synthetic resin attached to the end of the piston having a smooth supporting surface perpendicular to the axis of said piston and in contact with said flat surface of said shoe via said supporting surface, a pocket formed on the contact surface between this pad and shoe to which cylinder internal pressure is led through the interior of said piston, a spring which pushes each of said pistons in the extending direction, and a cylindrical piston cap formed of low friction synthetic resin which fits on the outer circumference of said piston and slides in said cylinder bore.

2. A hydraulic pump or motor as defined in claim 1, wherein a synthetic resin socket is embedded in said rotating disk member, and a spherical surface of said shoe engages with a hemispherical depression in said socket such that said surface is free to slide.

3. A hydraulic pump or motor as defined in claim 2, wherein a pocket is formed in a spherical surface contact part between said socket and said shoe, to which cylinder internal pressure is led via the interior of the cylinder.

4. A hydraulic pump or motor as defined in claim 1, wherein said rotating disk member is supported such that its outer circumferential surface and end surfaces are free to slide in said housing, and wherein a pocket to which fluid pressure is led, is formed in each supporting surface.

5. A hydraulic pump or motor as defined in claim 4, wherein a disk-shaped member of low friction synthetic resin is formed between an end face of said rotating disk member and said housing, and a bush of synthetic resin is interposed between the outer circumference of said disk member and said housing.

6. A hydraulic pump or motor as defined in claim 1, wherein said spring which pushes said piston is a coil spring, and a spring supporter of low friction synthetic resin is inserted in its center.

* * * * *